US006688209B1

(12) United States Patent
McMahon et al.

(10) Patent No.: US 6,688,209 B1
(45) Date of Patent: Feb. 10, 2004

(54) MULTI-CONFIGURATION MUNITION RACK

(75) Inventors: Roy P. McMahon, Indianapolis, IN (US); Michael F. Hampton, Zionsville, IN (US)

(73) Assignee: Raytheon Company, Waltham, MA (US)

(*) Notice: Subject to any disclaimer, the term of this patent is extended or adjusted under 35 U.S.C. 154(b) by 36 days.

(21) Appl. No.: 10/045,874

(22) Filed: Jan. 10, 2002

(51) Int. Cl.$^7$ ................................................ B64D 1/04
(52) U.S. Cl. .................... 89/1.59; 89/1.54; 89/37.19; 244/137.4
(58) Field of Search ................... 89/1.59, 1.54, 89/37.19; 244/137.4

(56) References Cited

U.S. PATENT DOCUMENTS

| | | | | |
|---|---|---|---|---|
| 2,395,913 A | * | 3/1946 | Schultze ..................... | 89/1.59 |
| 2,447,941 A | * | 8/1948 | Imber et al. ................. | 102/393 |
| 2,520,317 A | * | 8/1950 | Laddon et al. ............... | 89/1.59 |
| 3,511,400 A | * | 5/1970 | Oswald ...................... | 414/608 |
| 4,395,003 A | * | 7/1983 | Coutin ....................... | 244/137.4 |
| 4,412,475 A | * | 11/1983 | Hornby ...................... | 89/1.816 |
| 4,589,615 A | * | 5/1986 | Walker, Jr. ................. | 244/137.4 |
| 4,842,218 A | * | 6/1989 | Groutage et al. ............. | 244/3.28 |
| 5,219,133 A | * | 6/1993 | Christian ................... | 244/137.4 |
| 5,476,238 A | * | 12/1995 | Parker ....................... | 244/137.4 |
| 6,250,195 B1 | * | 6/2001 | Mendoza et al. .............. | 89/1.59 |
| 6,543,328 B1 | * | 4/2003 | Plummer et al. .............. | 89/1.54 |

OTHER PUBLICATIONS

Navair Publication 11-5-603, pp. 4-7, 6-5, 9-3, 9-13, 9-14, Apr. 1988.
Military Analysis Network (internet download), BRU-42 Triple Ejector Rack (TER), 2 pages, Apr. 2000.
Military Analysis Network (internet download), AGM-154 Joint Standoff Weapon (JSOW), 8 pages, Jun. 2000.
Military Analysis Network (internet download), Joint Direct Attack Munition (JDAM), 10 pages, Nov. 2001.
Military Analysis Network (internet download), BRU-46 and BRU-46 Bomb Rack Unit, 2 pages, Jan. 1999.
Military Analysis Network (internet download), BRU-55A and BRU-57A Multiple Carriage, "Smart" Bomb Rack, 3 pages, Jan. 1999.

* cited by examiner

*Primary Examiner*—Michael J. Carone
*Assistant Examiner*—M. Thomson
(74) *Attorney, Agent, or Firm*—William C. Schubert; Glenn H. Lenzen, Jr.

(57) ABSTRACT

A munition rack comprises a center strongback with an aircraft attachment hookup structure thereon, a first munition deployment structure, including a first munition deployer, affixed to a first outboard end of the center strongback, and a second munition deployment structure, including a second munition deployer, affixed to a second outboard end of the center strongback. The center strongback, the first munition deployment structure, and the second munition deployment structure are preferably dimensioned such that the distance between a first munition deployer transverse midpoint and a second munition deployer transverse midpoint is at least about 19 inches. There is at least one additional munition deployment structure selectively affixed to the bottom of the center strongback at an inboard location intermediate between the first outboard end and the second outboard end.

17 Claims, 5 Drawing Sheets

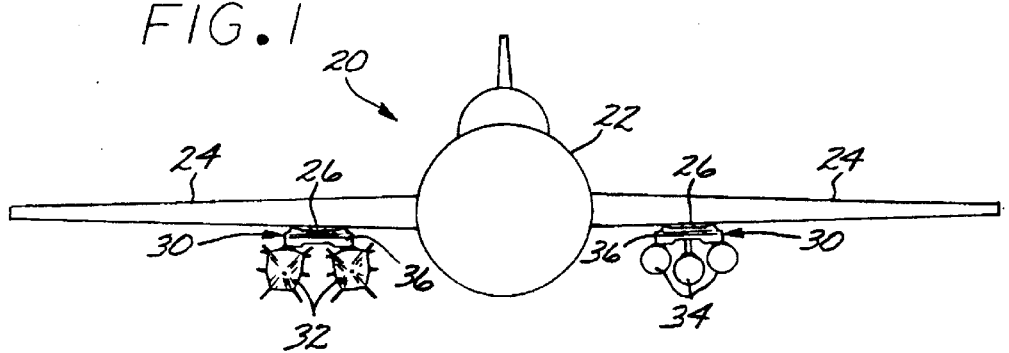
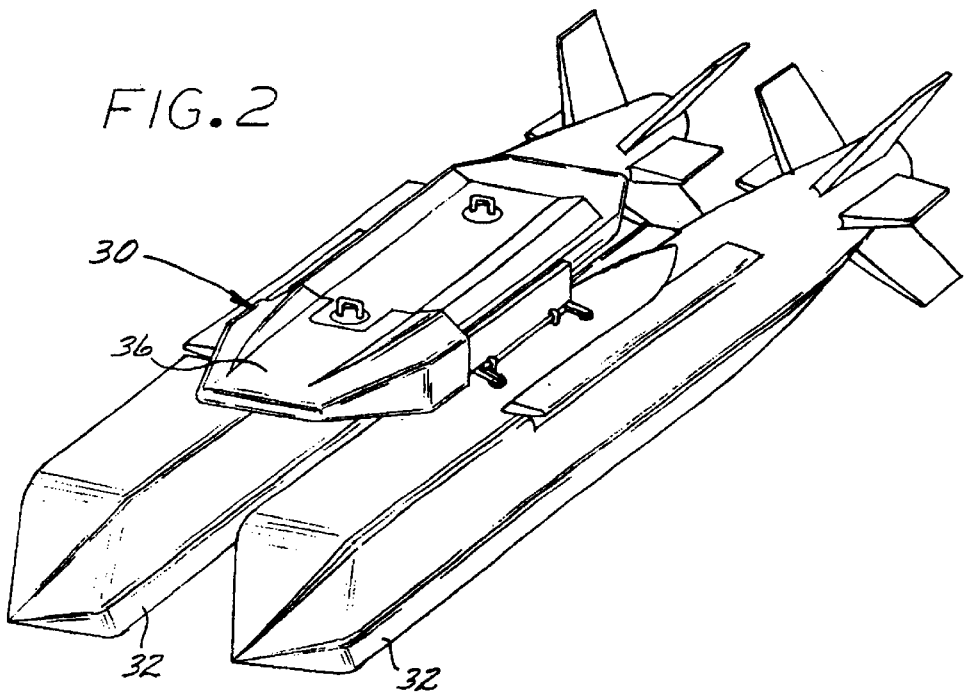

MULTI-CONFIGURATION MUNITION RACK

This invention relates to a munition rack that is suspended below an aircraft to carry munitions such as bombs and, more particularly, to a munition rack that may be readily converted to carry different types of munitions.

BACKGROUND OF THE INVENTION

A munition rack is supported from a hard point on the underside of a wing or fuselage of a military aircraft. The munition rack is provided with at least one bomb ejector or missile launcher onto which is loaded the conforming munition. The bomb ejector or missile launcher controllably deploys munitions. In some cases, the munition rack includes only the mechanism required to achieve the mechanical deployment of the munition.

Bombs were traditionally provided as conventional or "dumb" gravity bombs, which were aimed by setting the flight path of the aircraft and which, after dropping, had no capability to be controlled independently. An increasing trend is to employ munitions with in-flight programmable intelligence and the ability to be controlled after being dropped so that they may be guided toward the target independent of the flight path of the aircraft that dropped them. These bombs are generally termed "smart" bombs. Examples include bombs initially designed as smart bombs such as the Joint Standoff Weapon (JSOW), or conventional bombs that are converted to have a controllability function and thence serve as smart bombs, such as bombs converted with the Joint Direct Attack Munition (JDAM) kit. The higher production cost of these smart bombs relative to conventional bombs is usually offset by their greater efficiency as a result of much greater accuracy, the ability to precisely hit targeted locations, the reduction of collateral damage, and the greater survivability of the launching aircraft.

The introduction of smart bombs has complicated the design of the munition rack. The conventional bombs generally had an aerodynamic shape and cylindrical symmetry about their elongated axes. The newer "smart" bombs such as the JSOW may be provided with a wider frontal profile and flight surfaces (i.e., small wings) which are deployed after jettison which aids in their gliding for longer distances. These geometric differences result in the need to provide multiple types of munition racks for different missions that may involve conventional bombs and smart bombs. Additionally, the munition rack for the smart bomb must be able to contain certain of the in-flight programming electronics for the smart bomb, which electronics stays with the aircraft after the bomb is launched. The multiple types of munition racks required for the different missions add greatly to the costs of the aircraft systems and the complexity in field logistics support and movement.

There is a need for an improved approach to aircraft munition racks to accommodate the needs of different types of conventional and smart munitions. The present invention fulfills this need, and further provides related advantages.

SUMMARY OF THE INVENTION

The present invention provides a munition rack that is capable of carrying and providing electronics support for smart munitions and for conventional weapons as well. The munition rack may be readily interconverted between a configuration that carries wide-profile munitions and narrow-profile munitions, with its space efficiently used so as to carry the maximum number of each type of munition.

In one embodiment, the munition rack of the invention makes use of prior munition racks for part of its structure. The older munition racks are thereby used in a new role, so that they are not obsoleted, and the total cost of the new munition rack is reduced as compared with the cost for an entirely new structure.

In accordance with the invention, a munition rack comprises a center strongback having a front and a back located along a longitudinal axis of the center strongback, a top with an aircraft attachment hookup structure thereon, a bottom, and a first outboard end and a second outboard end each spaced apart from the longitudinal axis of the center strongback along a transverse direction perpendicular to the longitudinal axis of the center strongback. Desirably, the center strongback is hollow and includes an electronics bay therein. A first munition deployment structure is affixed to the first outboard end of the center strongback. The first munition deployment structure includes a first munition deployer having a first munition deployer transverse midpoint. A second munition deployment structure is affixed to the second outboard end of the center strongback. The second munition deployment structure includes a second munition deployer having a second munition deployer transverse midpoint. The center strongback, the first munition deployment structure, and the second munition deployment structure are preferably dimensioned such that the distance between the first munition deployer transverse midpoint and the second munition deployer transverse midpoint is preferably at least about 19 inches, more preferably at least about 21 inches, and most preferably from about 21 to about 24 inches. At least one additional munition deployment structure is selectively affixed to the bottom of the center strongback. Each additional munition deployment structure is affixed to the center strongback at an inboard location intermediate between the first outboard end and the second outboard end. At least one of the munition deployers is preferably a bomb ejector, and in a most preferred embodiment all of the munition deployers are bomb ejectors.

The first munition deployment structure preferably comprises a first-munition-deployment-structure secondary strongback, and the first munition deployer affixed to the first-munition-deployment-structure secondary strongback. The first-munition-deployment-structure secondary strongback is preferably hollow and includes an electronics bay therein. The first-munition-deployment-structure secondary strongback may have a skewed hexagonal cross-sectional shape. In a preferred embodiment, the first munition deployment structure comprises a first secondary strongback and one of the munition deployers from a type BRU-42 or a type TER-9A triple ejection rack.

The second munition deployment structure preferably comprises a second-munition-deployment-structure secondary strongback, and the second munition deployer affixed to the second-munition-deployment-structure secondary strongback. The second-munition-deployment-structure secondary strongback is preferably hollow and includes an electronics bay therein. The second-munition-deployment-structure secondary strongback may have a skewed hexagonal cross-sectional shape. In a preferred embodiment, the first munition deployment structure comprises a second secondary strongback and one of the munition deployers from a type BRU-42 or a type TER-9A triple ejection rack.

The present munition rack has sufficient spacing between the first munition deployer and the second munition deployer that it may receive JSOW 1000 pound-class bombs on each of the first and second munition deployers, which in this case are bomb ejectors. No additional munition deployment structure is used in this case. However, if smaller bombs such as the 500-pound class JDAM bombs or conventional 500-pound class Mk82 bombs are used, three of these bombs may be carried on the first, second, and additional munition deployers. In some cases, if a short bomb is used, multiple ones of the munition deployers may be positioned in pairs, one behind the other.

An important benefit of the preferred embodiment is that the existing type BRU-42 or TER-9A strongbacks and bomb ejectors may be used as building blocks for the present munition rack. A great many of these type BRU-42 and TER-9A strongbacks and bomb ejectors have been manufactured and are in inventory and available for use on military aircraft. These type BRU-42 or TER-9A strongbacks and bomb ejectors become the secondary strongbacks and bomb ejectors in the present approach, and therefore remain in service and need not be discarded. The cost of the present munition rack is thereby significantly reduced as compared with the cost of a bomb ejector design that uses entirely new components.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a front elevational view of an aircraft carrying munition racks according to the invention;

FIG. 2 is a detail perspective view of one of the munition racks shown in FIG. 1, with two JSOWs mounted thereon;

DETAILED DESCRIPTION OF THE INVENTION

Figure 3:
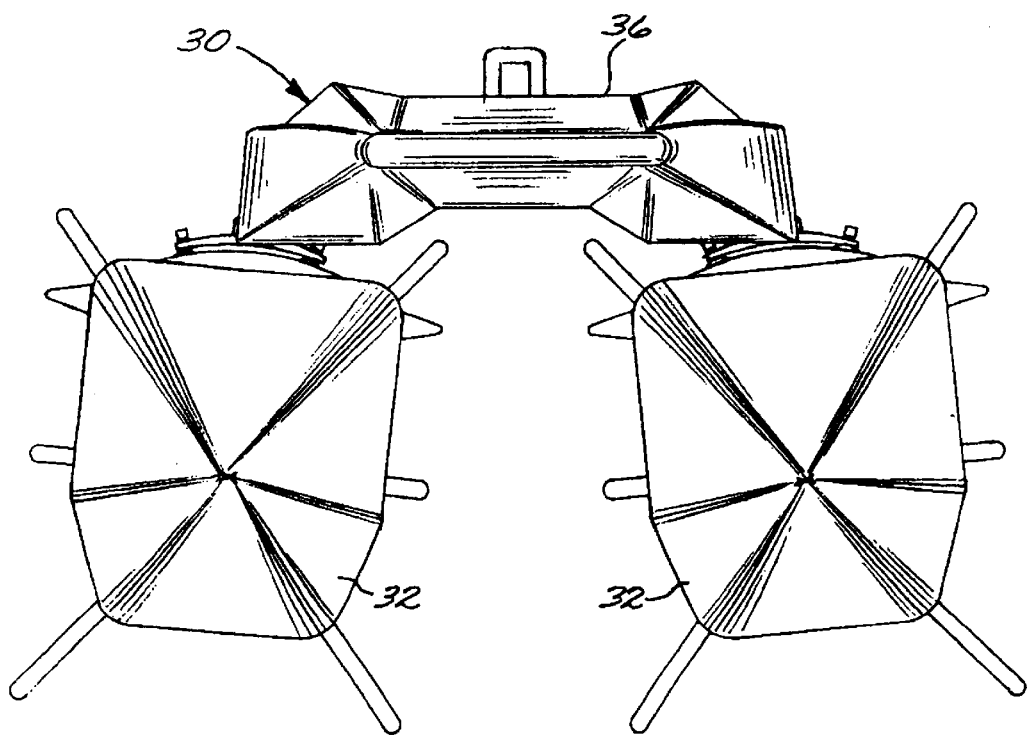
FIG. 3 is a front elevational view of the munition rack of FIG. 2, with two JSOWs mounted thereon.

FIG. 1 depicts an aircraft 20 having a fuselage 22 and wings 24. A main munition pylon 26 is supported from an underside of each wing 24. The main munition pylon 26 is a standard component available on the aircraft 20 and is not a part of the present invention. A munition rack 30 having an aerodynamic fairing 36 is supported from each main munition pylon 26. Below one wing 24 the munition rack 30 is configured to carry two munitions 32, in this case two 1000 pound JSOWs. Below the other wing 24 the munition rack 30 is configured to carry three munitions 34, in this case three 500-pound Mark 82 JDAM bombs. (Aircraft munitions loads are normally symmetrically configured, but an asymmetric configuration is shown in FIG. 1 to illustrate the flexibility of the present approach.)

Figure 5:
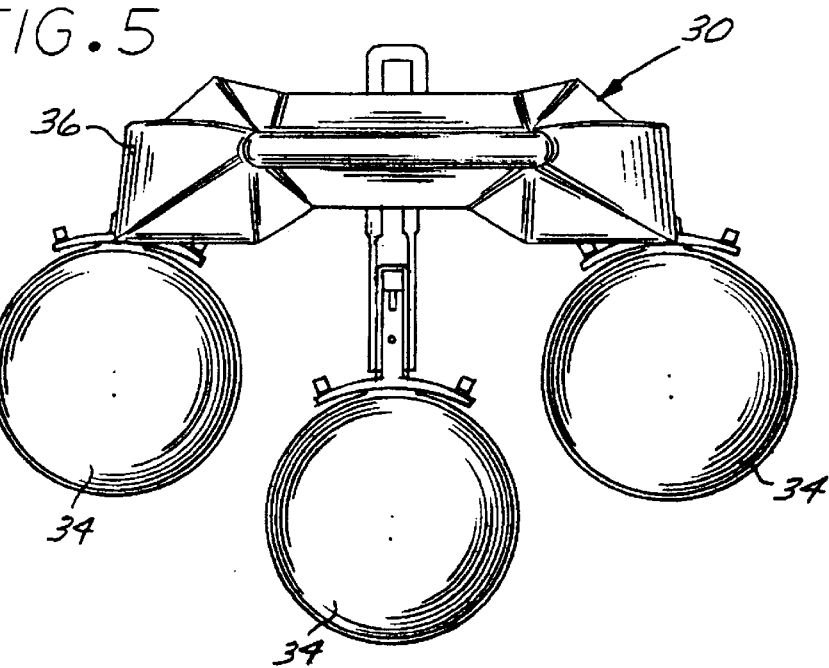
FIG. 5 is a front elevational view of the munition rack of FIG. 4, with three Mark 82 JDAM bombs mounted thereon.
Figure 4:
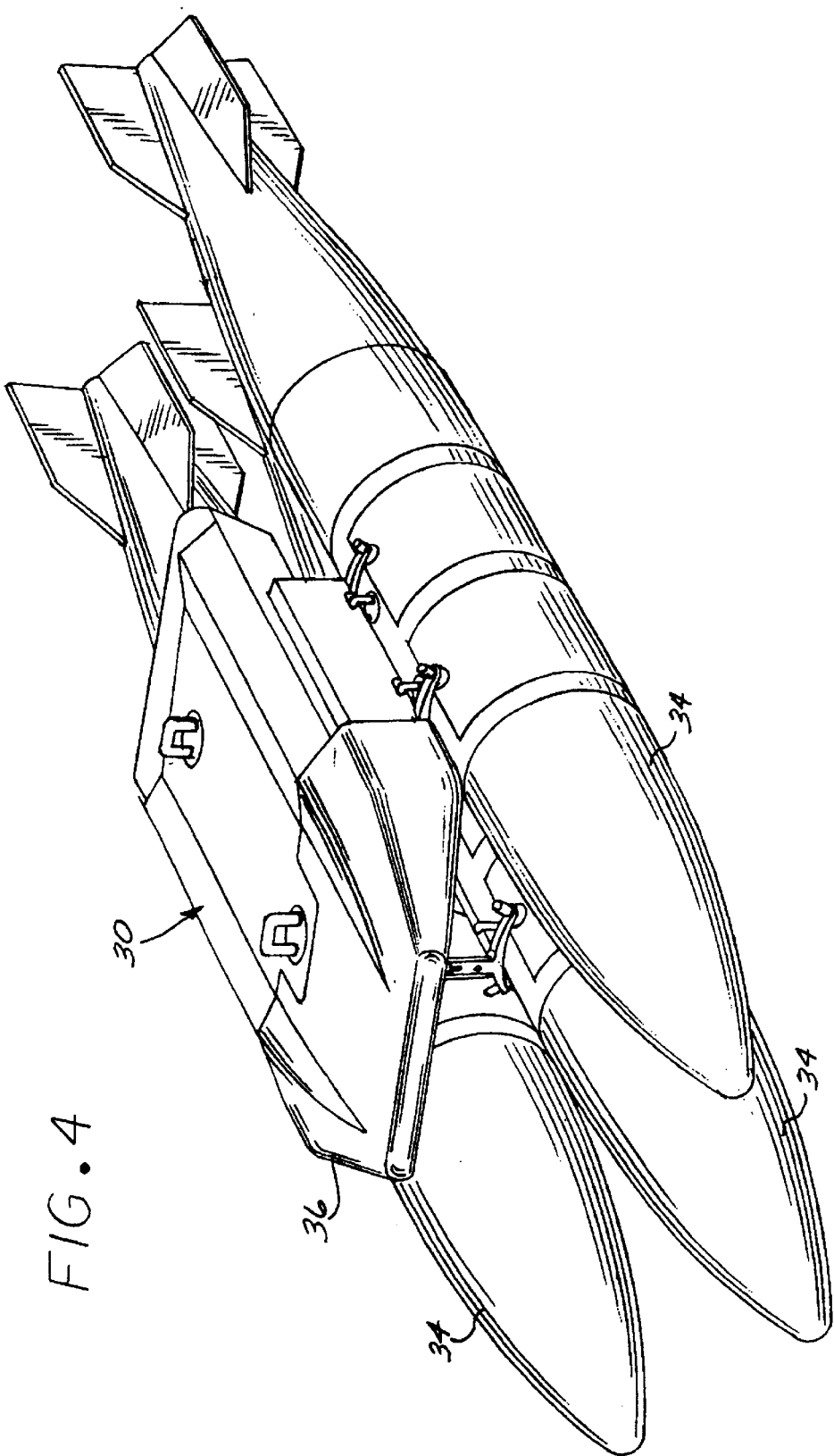
FIG. 4 is a detail perspective view of one of the munition racks shown in FIG. 1, with three Mark 82 JDAM bombs mounted thereon.

FIGS. 2–3 illustrate the munition rack 30 isolated from the aircraft 20, with the two 1000-pound JSOW munitions 32. FIGS. 4–5 illustrate the munition rack 30 isolated from the aircraft 20, with the three 500-pound JDAM bomb munitions 34. In each of FIGS. 1–5, the munition rack 30 is shown with its aerodynamic fairing 36, which overlies its internal structure, in place as it would be for flight. FIGS. 1–5 illustrate the ability of the same munition rack 30 to convert between carrying either two or three munitions. The present invention is not limited to these particular types of munitions, which are shown only by way of illustration. The munition rack 30 may also carry conventional bombs and rockets, for example.

Figure 6:
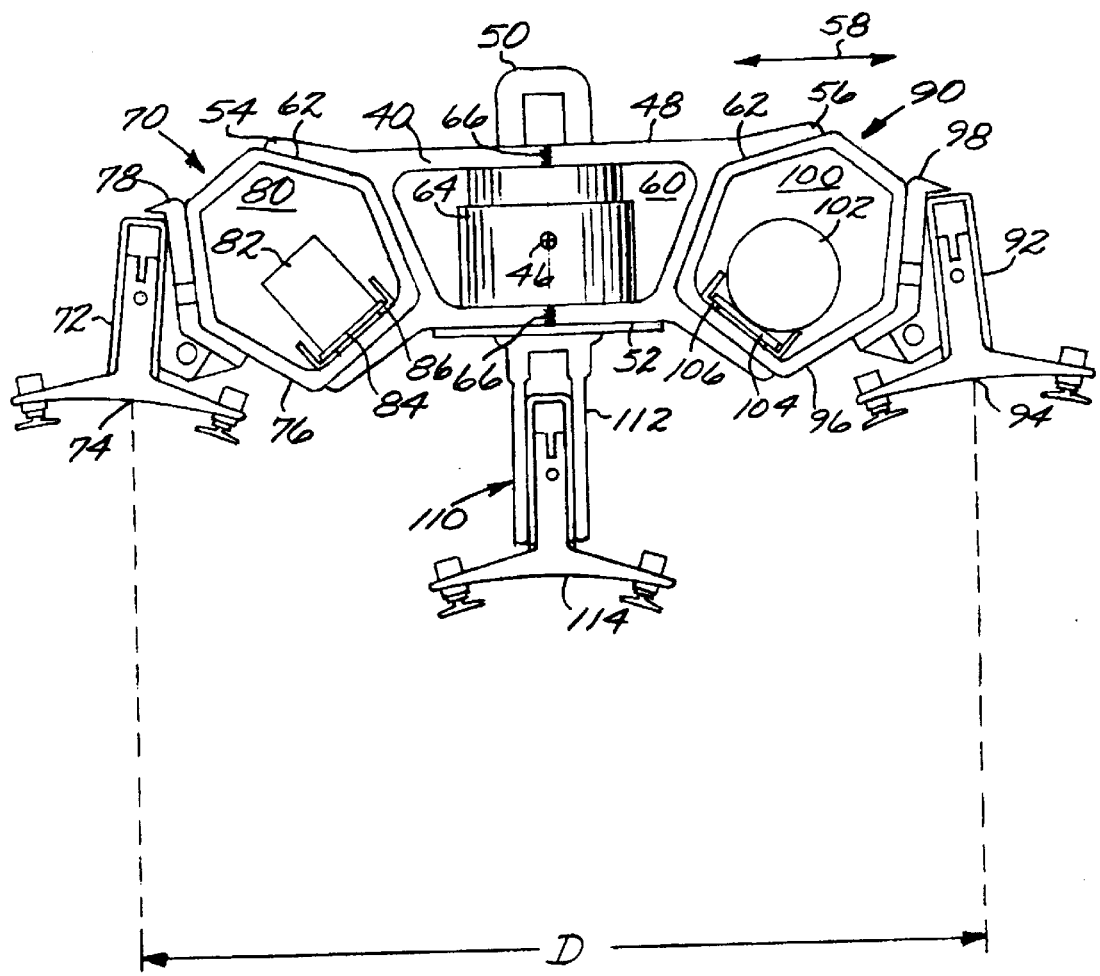
FIG. 6 is a schematic front elevational view of the munition rack configured for three bombs, with the aerodynamic fairings removed.
Figure 7:
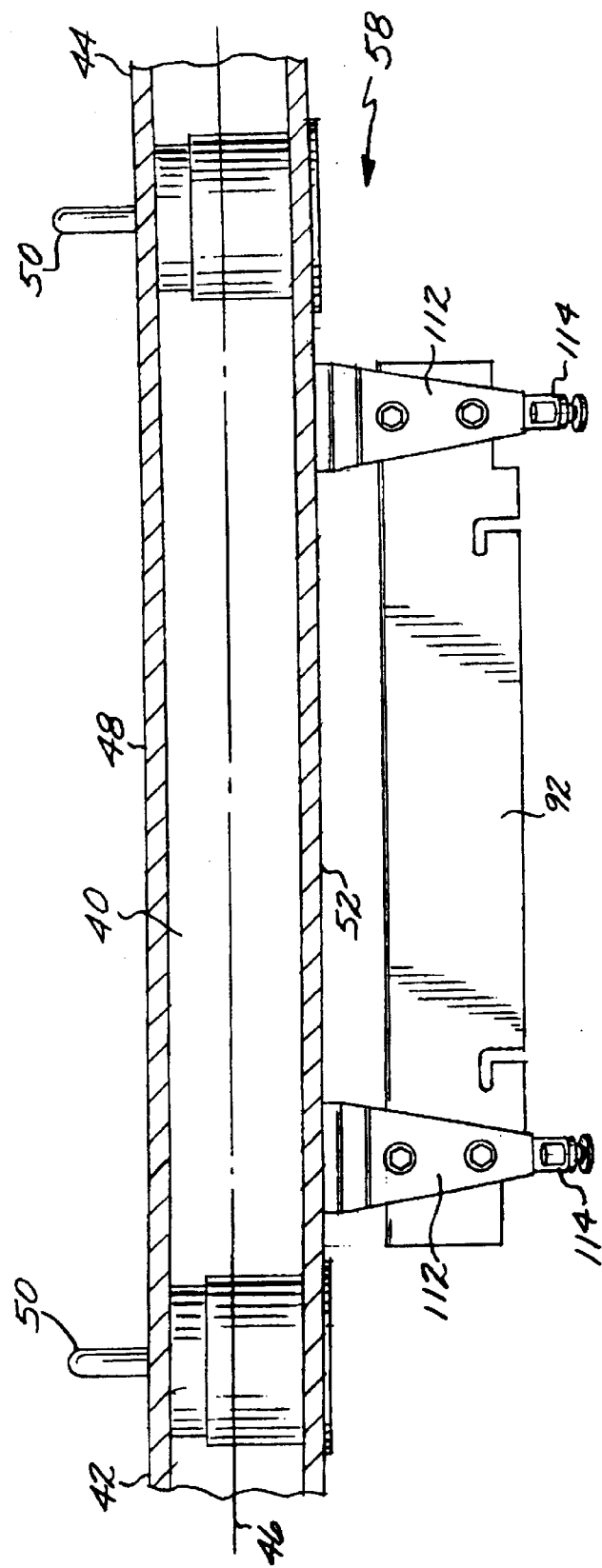
FIG. 7 is a schematic side elevational view of the munition rack of FIG. 6, with a portion shown section.

FIGS. 6–7 illustrate the internal structure of the munition rack 30, with the aerodynamic fairing removed. The munition rack 30 includes a center strongback 40 having a front 42 and a back 44 located along a longitudinal axis 46 of the center strongback 40. There is, additionally, a top 48 with an aircraft attachment hookup structure 50 thereon, and a bottom 52. The aircraft attachment hookup structure 50 is preferably a standard pair of lugs spaced 30 inches apart along the longitudinal axis 46 to allow hooking to downwardly extending hooks (not shown) on the main munition pylon 26. The center strongback 40 further includes a first outboard end 54 and a second outboard end 56 each spaced apart from the longitudinal axis 46 of the center strongback 40 along a transverse direction 58 perpendicular to the longitudinal axis 46 of the center strongback 40.

The center strongback 40 is preferably an aluminum alloy extrusion having a central volume 60 and a deployment-structure receiver 62 at each of the first outboard end 54 and at the second outboard end 56. The central volume 60 may be empty or filled with electronics or other equipment 64. The center strongback 40 of this configuration may be manufactured most readily by extruding two portions separately and then joining them along a weld joint 66.

A first munition deployment structure 70 is affixed to the deployment-structure receiver 62 at the first outboard end 54 of the center strongback 40, preferably by bolting. The first munition deployment structure 70 includes a first munition deployer 72 having a first munition deployer transverse midpoint 74. (The first munition, not shown, is attached to the first munition deployer 72 by conventional techniques.) Preferably, the first munition deployment structure 70 comprises a first-munition-deployment-structure secondary strongback 76, and the first munition deployer 72 affixed to the first-munition-deployment-structure secondary strongback 76, preferably with a first bracket 78 that is attached to the first munition deployer 72 by bolting and to the first-munition-deployment-structure secondary strongback 76 by bolting. The first-munition-deployment-structure secondary strongback 76 is preferably hollow and includes a first electronics bay 80 therein. First electronics devices 82 are mounted on a first tray 84 that slides into the interior of the electronics bay 80 on first sliders 86.

The first-munition-deployment-structure secondary strongback 76 preferably has a hollow skewed hexagonal cross-sectional shape, as illustrated. Most preferably, the first munition deployment structure 70 comprises the secondary strongback made of the strongback of a type BRU-42 or a type TER-9A triple ejection rack, both of which are known devices that are widely used for military aircraft. The first munition deployer 72 is preferably one of the munition deployers from the type BRU-42 or the type TER-9A triple ejection rack. By using the strongback and one of the munition deployers from the type BRU-42 or TER-9A triple ejection rack, these available components are used and need not be discarded in order to make use of the present invention.

A second munition deployment structure 90 is affixed to the deployment-structure receiver 62 at the second outboard end 56 of the center strongback 40, preferably by bolting. The second munition deployment structure 90 includes a second munition deployer 92 having a second munition deployer transverse midpoint 94. (The second munition, not shown, is attached to the second munition deployer 92 by conventional techniques.) Preferably, the second munition deployment structure 90 comprises a second-munition-deployment-structure secondary strongback 96, and the second munition deployer 92 affixed to the second-munition-deployment-structure secondary strongback 96, preferably with a second bracket 98 that is attached to the second munition deployer 92 by bolting and to the second-munition-deployment-structure secondary strongback 96 by bolting. The second-munition-deployment-structure secondary strongback 96 is preferably hollow and includes a second electronics bay 100 therein. Second electronics devices 102 are mounted on a second tray 104 that slides into the interior of the electronics bay 100 on second sliders 106. The electronics devices 82 and 102 typically comprise the sensing and control electronics for the munitions carried by the respective munition deployment structures 70 and 90.

The second-munition-deployment-structure secondary strongback 96 preferably has a hollow skewed hexagonal cross-sectional shape, as illustrated. Most preferably, the second munition deployment structure 90 comprises the secondary strongback made of the strongback of a type BRU-42 or a type TER-9A triple ejection rack. The second munition deployer 92 is preferably one of the munition deployers from the type BRU-42 or the type TER-9A triple ejection rack. By using the strongback and one of the munition deployers from the type BRU-42 or TER-9A triple ejection rack, these available components are used and need not be discarded in order to make use of the present invention.

The center strongback 40, the first munition deployment structure 70, and the second munition deployment structure 90 are dimensioned such that the distance D between the first munition deployer transverse midpoint 74 and the second munition deployer transverse midpoint 94 is sufficient to accommodate the first munition and the second munition that are attached thereto. In the case where the munition rack 30 is sized to accommodate two 1000-pound JSOW bombs, the distance D is preferably at least about 19 inches, more preferably at least about 21 inches, and most preferably from about 21 to about 24 inches. If the distance D is less than about 19 inches, then the two 1000-pound JSOW bombs are too closely spaced for the first bomb to be reliably ejected.

At least one additional munition deployment structure 110 may be selectively affixed to the bottom 52 of the center strongback 40, preferably by bolting. Each additional munition deployment structure 110 is affixed to the center strongback 40 at an inboard location intermediate between the first outboard end 54 and the second outboard end 56. FIG. 6 illustrates a single additional munition deployment structure 110, but there may be further munition deployment structures 110 in either a side-by-side or a one-behind-the-other relation (i.e., spaced along the longitudinal axis 46) with the illustrated additional munition deployment structure 110. Each additional munition deployment structure 110 includes a mount 112 that is affixed to the bottom 52 of the center strongback 40, and an additional munition deployer 114 that is affixed to the mount 112, preferably by bolting. The additional munition deployer is preferably a munition deployer from a BRU-42 or a type TER-9A triple ejection rack. As used herein, "selectively affixed" means that each additional deployment structure 110 may be affixed to the bottom 52 of the center strongback 40 as needed, or it may be removed. The affixing or removal of the additional munition deployment structure(s) 110 is a conversion feature of the present munition rack 30.

The munition deployers 72, 92, and 114 may be of the same or of different types. In one preferred configuration, at least one of the munition deployers 72, 92, and 114 is a bomb ejector. The munition deployers 72, 92, and 114 may instead be of other types, such as rocket launch rail structures, rocket pod carriers, machine gun or cannon pod carriers, reconnaissance pods, fuel-tank carriers, and the like.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A munition rack comprising
   a center strongback having a front and a back located along a longitudinal axis of the center strongback, a top with an aircraft attachment hookup structure thereon, a bottom, and a first outboard end and a second outboard end each spaced apart from the longitudinal axis of the center strongback along a transverse direction perpendicular to the longitudinal axis of the center strongback;
   a first munition deployment structure affixed to the first outboard end of the center strongback, the first munition deployment structure including
      a first-munition-deployment-structure secondary strongback, and
      a first munition deployer affixed to the first-munition-deployment-structure secondary strongback and having a first munition deployer transverse midpoint;
   a second munition deployment structure affixed to the second outboard end of the center strongback, the second munition deployment structure including a second munition deployer having a second munition deployer transverse midpoint; and
   at least one additional munition deployment structure selectively affixed to the bottom of the center strongback, each additional munition deployment structure being affixed to the center strongback at an inboard location intermediate between the first outboard end and the second outboard end and comprising an additional munition deployer.

2. The munition rack of claim 1, wherein the center strongback, the first munition deployment structure, and the second munition deployment structure are dimensioned such that a distance between the first munition deployer transverse midpoint and the second munition deployer transverse midpoint is at least about 19 inches.

3. The munition rack of claim 1, wherein the center strongback is hollow and includes an electronics bay therein.

4. The munition rack of claim 1, wherein the first-munition-deployment-structure secondary strongback is hollow and includes an electronics bay therein.

5. The munition rack of claim 1, wherein the first-munition-deployment-structure secondary strongback has a skewed hexagonal cross-sectional shape.

6. The munition rack of claim 1, wherein the first munition deployment structure comprises
   the first-munition-deployment-structure secondary strongback and one of the munition deployers from a type BRU-42 or a type TER-9A triple ejection rack.

7. The munition rack of claim 1, wherein the second munition deployment structure comprises a second-munition-deployment-structure secondary strongback, and the second munition deployer affixed to the second-munition-deployment-structure secondary strongback.

8. The munition rack of claim 7, wherein the second-munition-deployment-structure secondary strongback is hollow and includes an electronics bay therein.

9. The munition rack of claim 1, wherein the second munition deployment structure comprises a second-munition-deployment-structure secondary strongback having a skewed hexagonal cross-sectional shape, and the second munition deployer affixed to the second-munition-deployment-structure secondary strongback.

10. The munition rack of claim 1, wherein the second munition deployment structure comprises a secondary strongback and one of the munition deployers from a type BRU-42 or a type TER-9A triple ejection rack.

11. The munition rack of claim 1, wherein at least one of the munition deployers is a bomb ejector.

12. A munition rack comprising a center strongback having a front and a back located along a longitudinal axis of the center strongback, a top with an aircraft attachment hookup structure thereon, a bottom, and a first outboard end and a second outboard end each spaced apart from the longitudinal axis of the center strongback along a transverse direction perpendicular to the longitudinal axis of the center strongback;

a first munition deployment structure affixed to the first outboard end of the center strongback and including
a first-munition-deployment-structure secondary strongback, and
a first munition deployer affixed to the first-munition-deployment-structure secondary strongback and having a first munition deployer transverse midpoint;

a second munition deployment structure affixed to the second outboard end of the center strongback and including
a second-munition-deployment-structure secondary strongback, and
a second munition deployer affixed to the second-munition-deployment-structure secondary strongback and having a second munition deployer transverse midpoint, where the center strongback, the first munition deployment structure, and the second munition deployment structure are dimensioned such that the distance between the first munition deployer transverse midpoint and the second munition deployer transverse midpoint is at least about 19 inches; and at least one additional munition deployment structure selectively affixed to the bottom of the center strongback, each additional munition deployment structure being affixed to the center strongback at an inboard location intermediate between the first outboard end and the second outboard end and comprising an additional munition deployer.

13. The munition rack of claim 12, wherein the first munition deployment structure comprises the secondary strongback and one of the munition deployers from a type BRU-42 or a type TER-9A triple ejection rack.

14. The munition rack of claim 12, wherein the second munition deployment structure comprises the secondary strongback and one of the munition deployers from a type BRU-42 or a type TER-9A triple ejection rack.

15. The munition rack of claim 12, wherein at least one of the munition deployers is a bomb ejector.

16. A munition rack comprising a center strongback having a front and a back located along a longitudinal axis of the center strongback, a top with an aircraft attachment hookup structure thereon, a bottom, and a first outboard end and a second outboard end each spaced apart from the longitudinal axis of the center strongback along a transverse direction perpendicular to the longitudinal axis of the center strongback;

a first munition deployment structure affixed to the first outboard end of the center strongback and including a first secondary strongback and a first one of the munition deployers from a type BRU-42 or a type TER-9A triple ejection rack, the first one of the munition deployers having a first munition deployer transverse midpoint, a second munition deployment structure affixed to the second outboard end of the center strongback and including a second secondary strongback and a second one of the munition deployers from a type BRU-42 or a type TER-9A triple ejection rack, the second one of the munition deployers having a second munition deployer transverse midpoint, where the center strongback, the first munition deployment structure, and the second munition deployment structure are dimensioned such that the distance between the first munition deployer transverse midpoint and the second munition deployer transverse midpoint is at least about 19 inches; and at least one additional munition deployment structure selectively affixed to the bottom of the center strongback, each additional munition deployment structure being affixed to the center strongback at an inboard location intermediate between the first outboard end and the second outboard end and comprising an additional munition deployer from a type BRU-42 or a type TER-9A triple ejection rack.

17. The bomb munition rack of claim 16, wherein each of the munition deployers are bomb ejectors.

* * * * *